D. C. WATT AND F. A. GREARSON.
AUTOMOBILE TOP.
APPLICATION FILED OCT. 5, 1915. RENEWED JAN. 6, 1922.
1,416,659.
Patented May 16, 1922.
2 SHEETS—SHEET 1.
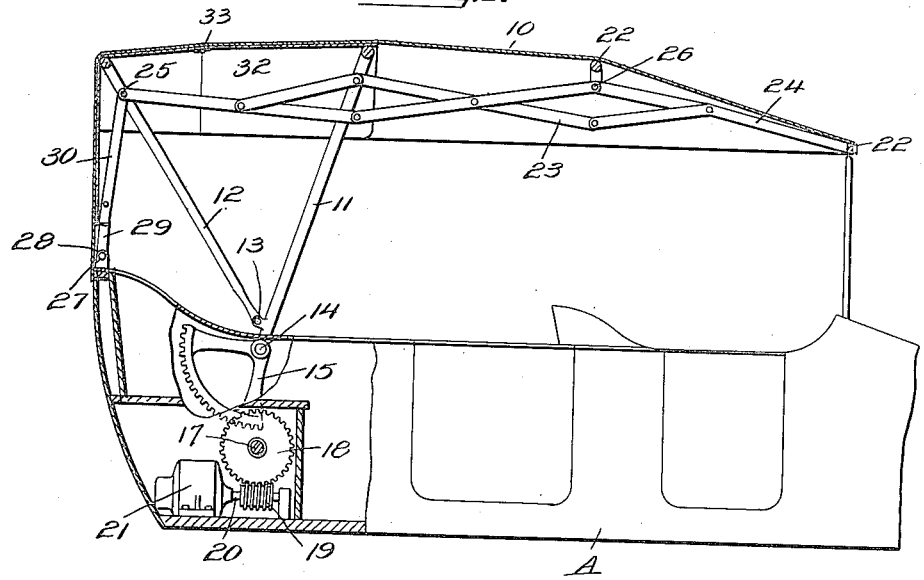
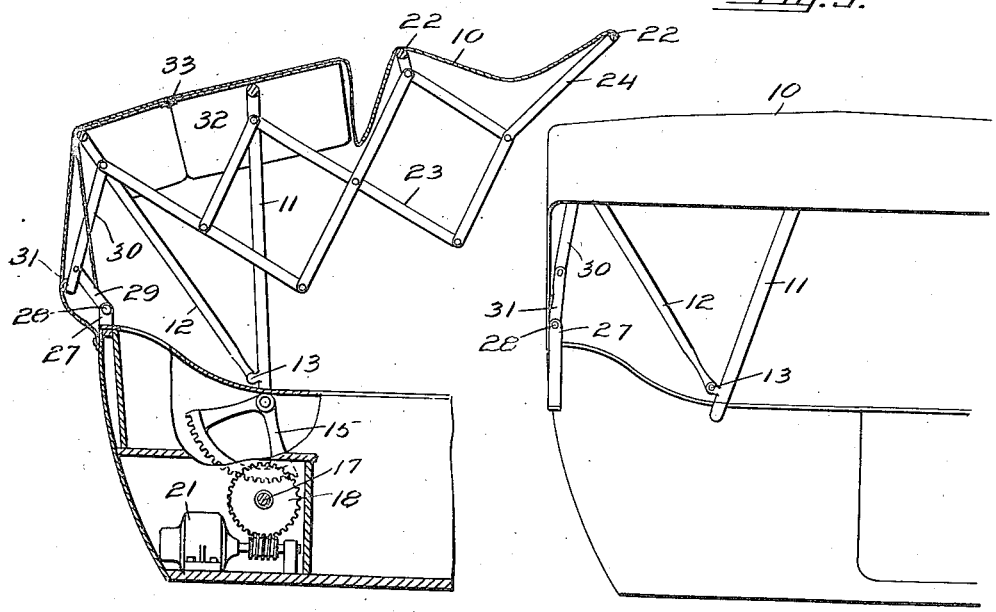
Inventor
D. C. Watt.
F. A. Grearson.
Witnesses
By Victor J. Evans
Attorney

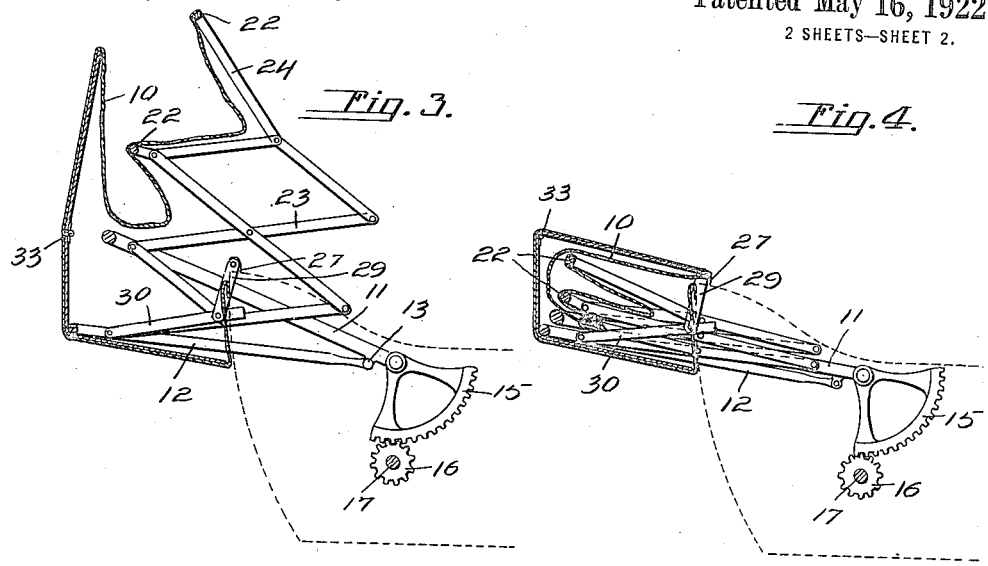
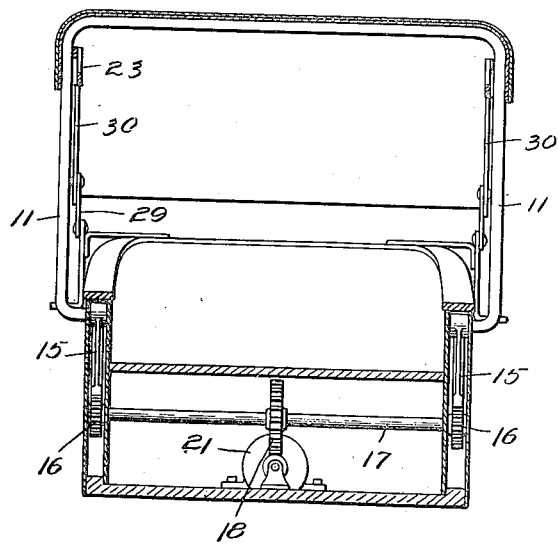

UNITED STATES PATENT OFFICE.

DELTON C. WATT AND FREDERICK A. GREARSON, OF BARRE, VERMONT.

AUTOMOBILE TOP.

1,416,659.

Specification of Letters Patent. Patented May 16, 1922.

Application filed October 5, 1915, Serial No. 54,226. Renewed January 6, 1922. Serial No. 527,519.

*To all whom it may concern:*

Be it known that we, DELTON C. WATT and FREDERICK A. GREARSON, citizens of the United States, residing at Barre, in the county of Washington and State of Vermont, have invented new and useful Improvements in Automobile Tops, of which the following is a specification.

This invention relates to foldable tops for vehicles, motor boats and the like and more especially to that class of combination foldable tops and dust covers for automobiles, motor boats or other uses to which the invention may be adapted.

The primary object of the invention is the provision of a top of this character wherein the same is automatically raised and lowered under the action of a motor which is electrically controlled, and the circuit thereof being closed at a point convenient to the driver of the vehicle, automobile or the like, thereby obviating the handling of the top in the usual manner for the raising and lowering thereof.

Another object of the invention is the provision of a top of this character wherein the construction thereof is novel in form so that it can be automatically raised and lowered with dispatch, and when in lowered position serves as a dust-proof covering for the top.

A further object of the invention is the provision of a top of this character wherein on the folding thereof the same is rendered compact, and upon the raising and lowering of the top the flexible body of the same is protected throughout a greater portion of its length against undue creasing, thereby assuring longevity thereto.

A still further object of the invention is the provision of a top of this character which is extremely simple in construction, thoroughly reliable and efficient in its operation, strong, durable, light in weight, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—

Figure 1 is a fragmentary side elevation of an automobile body partly broken away showing in vertical sectional elevation the top constructed in accordance with the invention applied and extended.

Figure 2 is a fragmentary vertical longitudinal sectional view showing the top partly folded.

Figure 3 is a view similar to Figure 2, showing the top further folded.

Figure 4 is a view similar to Figure 2, showing the top completely folded.

Figure 5 is a fragmentary side elevation of the top raised.

Figure 6 is a vertical transverse sectional view.

Similar reference characters indicate corresponding parts throughout the several views in the drawings.

It is to be understood that the top is adapted particularly for automobile one man foldable tops, although the said top is adaptable for vehicles generally. The accompanying drawing illustrates the invention in connection with the one man top for automobiles, but as stated, the said invention is not restricted to such application.

Referring to the drawings in detail, A designates a portion of the vehicle body, which may be of any make or design, and is provided with a foldable top comprising a flexible cover 10 and a plurality of bows or like supports. The numeral 11 indicates what may be termed the main or power bow, and 12 the auxiliary or supplemental bow, which is swingingly connected to the main or power bow through the medium of a pivot 13 passed through each limb thereof and supported by the main or power bow, the latter being rotatably mounted upon stud journals 14 which are fixed within the body of the vehicle A at opposite sides thereof. The main or power bow 11 has formed at its pivoted ends toothed segments 15 which mesh with pinions 16 fixed to a driven shaft 17 which is suitably journaled in the body A beneath the rear seat therein, the said shaft 17 being also provided with a driven gear 18 which meshes with a worm screw 19 formed on the driving shaft 20 of an electric motor 21 supported within the body A and concealed beneath the rear seat therein, and this motor is arranged in an electric circuit (not shown) which has a normally open closing switch (not shown), which is located within convenient reach of the driver of the vehicle, automobile, or the like, and on the closing of the circuit the motor will become active for either raising or lowering the top, the motor being of the reversible type for this purpose, and the circuit closing devices being arranged to direct the motor for the raising or lowering of the top.

Augmenting the bows 11 and 12 are the arches 22 and 22', to which is attached the forward part of the cover 10. The rear part of the cover is attached to the bow 12, and its lower edge is secured to the back of the vehicle. Mounted in each side of the top is the lazy-tong 23, with its forward lever 24 secured at its front end to the arch 22 and with its rear end connected by an intermediate lever with the bow 11 at 26'. The forward lever 24 is also connected by the link 41 with the arch 22' at 26. The rear lever 24' of the lazy-tong is pivoted at its rear end to the bow 12 at 25, and the front end of the lever is connected by an intermediate lever with the arch 22' at 26. A link 42 connects the rear lever 24' with the bow 11 at 26'. When the bows 11 and 12 are forced apart they will straighten out the lever 24' and the link 42 between the pivots 25 and 26' and thereby cause an extension of the lazy-tongs as shown in Fig. 1. The extension of both lazy-tongs, through the extreme separation of the bows 11 and 12, will project the cover 10 to its full open position. The retraction of both lazy-tongs, through the closing of the bows 11 and 12, will collapse the cover 10 to its full closed position, the complete closing of the bows occurring when they reach downward limit of their movement as shown in Fig. 4. When the lazy-tongs are fully extended and are so held by the separation of the bows 11 and 12 through the action of the power driven mechanism the cover 10 will be positively held in its full open position. When the lazy-tongs are retracted and are so held by the closing of the bows 11 and 12 through the action of the power driven mechanism the cover will be positively held in its full collapsed position. Fixed to the back of the body A are bearings 27 to which are pivoted, as at 28, the sections 29 of the break-joint links, the sections 30 of which are pivoted at 25 to the bow 12 and to the operating levers 24' of the lazy-tongs. The break-joint links serve to limit the upward movement of the bow 12 and also to withstand the strain of the lazy-tongs while the latter are being opened. Without these links the opening strain would be borne by that part of the cover between the bow 12 and the back of the vehicle. When the bows 11 and 12 are moved together to collapse the top the links break outwardly and downwardly, as shown in Figs. 2 and 3, to permit the lowering of the collapsed top. The nib 31 on the section 30 striking against the section 29 prevents the link from breaking inwardly at the initiation of the collapsing movement of the bow 12. When the top is in its full collapsed position, as shown in Fig. 4, a considerable part of its weight is carried by the link sections 29.

Coextensive with approximately the rear half of the flexible cover 10 is the protective sectional housing 32 of stiff material, preferably of sheet metal. This housing comprises the angular section 34 secured at its angle over the bow 12, and the flat section 35 hinged at 33 to the angular section. Projecting inwardly from the outer edges of the sections 34 and 35 are the sides 36 and 37, respectively, slightly offset from each other so that their adjacent edges can pass each other when the sections are closed together. When the top is collapsed the housing sections 34 and 35, with their sides 36 and 37, respectively, fold together into a box-like receptacle containing the flexible part of the cover, the arches 22, 22', the lazy-tongs, and part of the bows 11 and 12, as shown in Fig. 4. When so arranged the contained parts are protected from dust, weather conditions, and injury.

As shown and described, the motor 21, the motor shaft 20 with its worm gear 19, the gear wheel 18, the opposite pinions 16 and the opposite segment gears 15 are all in co-operative working relation whether the motor and top operating mechanism are at rest or operating to raise or lower the top to its open or closed position on the supporting body, so that the co-operating devices are ready at all times to operate to raise the top to its open position or to lower the top when operated in an opposite direction by reversing the motor, without shifting power transmitting devices.

This co-operative assembling of the motor, top operating mechanism and co-operative devices normally in co-operative working engagement reduces the cost of construction, cuts down the number of working parts, and simplifies the operation of the apparatus. This arrangement of the working parts insures a quick and ready operation of the devices for raising or lowering the top by avoiding the use of clutches, shifting levers, gears and other co-operating devices necessary for the apparatus where the motor and co-operating working parts are not normally in co-operative working relation to each other so as to start and stop without shifting mechanism to convey the power from the motor to the devices to be operated.

In the construction of this apparatus, the objections due to the difficulties of readily engaging the clutches, upon the shifting of the levers, to the devices to be operated through intermediate transmitting gears as well as the sudden strain of the engaging mechanisms, are all avoided by the co-operative arrangements of the working parts of this apparatus.

If it be desired to raise the top from its full closed position, shown in Fig. 4 to its full open position over the vehicle or other apparatus shown in Fig. 1, the motor 21 is energized and operates the shaft 20 and worm gear 19, the gear 18, the pinions 16 and the segments 15, formed on the lower pivoted ends of the power member 11, to lift said power member 11 from the position shown in Fig. 4 to that shown in Fig. 3. In this movement, the foremost bow 22 moves the front section of the dust cover 32 out of the path of travel of the lazy tongs 23 and the forward flexible portion of the cover 10. This motion continues, as indicated in Figs. 3 and 2, with the bows 11 and 12 moving together, after leaving their positions shown in Fig. 2, until the bow 12 reaches the position shown in Fig. 1 where it stops while the power bow 11 continues its forward movement until the expansible devices and top with the power bow 11 reach the positions shown in Fig. 1.

Now if it be desired to lower the top from the position shown in Fig. 1 to the position shown in Fig. 4, the motor is reversed and the current operates the parts in a reverse direction to that previously described for raising the top, so that the top and its operating mechanism move from the position shown in Fig. 1 to that shown in Fig. 2, then to the position shown in Fig. 3 and finally to the position shown in Fig. 4 with the bows and major part of the top folding within the housing formed by the rear of the cover 10 and the sections of the dust cover 32 with its side extensions, and lastly as the parts take the position shown in Fig. 4, the front top forming section of the dust cover 32 drops to the position shown in Fig. 4 and, as shown, houses the major part of the top and its operating bows. These top forming sections of the dust cover 32 are provided with downward extensions (Figs. 1 and 2) on opposite sides which act to enclose the opposite sides of the cover when in its folded position, as shown in Fig. 4.

In both operations, that is, when the top has been moved to its forward position or when the top has been moved to its closed position the circuit to the motor is broken by a suitable switch manually operated and the parts remain in the position to which they have been respectively moved.

It will be apparent that on the motor becoming active the top can be either raised or lowered automatically without requiring the hand manipulation thereof, as is usual.

From the foregoing description, taken in connection with the accompanying drawings, the construction and manner of operation of the device will be clearly understood, and therefore a more extended explanation has been omitted.

What is claimed is:—

1. In a foldable top, a top or cover, mechanism for operating said top to raise or lower it to its open or to its closed position, supporting bows for the top and forming a part of said top operating mechanism, a supporting body on which said bows are pivotally mounted, expansible devices pivotally connected to said bows and to said top, a protecting cover of co-operating sections located on said top and forming a part thereof and adapted upon the folding of the top to its closed position to fold with said top to form a housing for the supporting bows and a major portion of the top when in folded relation to each other, and motor mechanism continuously co-operating with said top operating mechanism at its pivotal point on said supporting body for continuously actuating the said top operating mechanism to move the top to its open position over the supporting body and in its movement to lift a portion of said protecting cover to allow the forward end of the cover to move towards its open position and upon the folding of said top into its closed position, by the operation of said top operating mechanism for lowering the top, to lower the said portion of the top to form a housing for the supporting bows and a major portion of the top.

2. In a foldable top, a top or cover, mechanism for operating said top to raise or lower it to its open or to its closed position, supporting bows for the top and forming a part of said top operating mechanism, a supporting body on which said bows are pivotally mounted, expansible devices pivotally connected to said bows and to said top, a protecting cover of co-operating sections located on said top and forming a part thereof on the rear of the same and adapted upon the folding of the top to its closed position to fold with said top to form a housing for the supporting bows and a major portion of the top when in folded relation to each other, a motor, and a power shaft continuously co-operating with said motor and with the said top operating mechanism at its pivotal point on said supporting body for continuously actuating the said top operating mechanism with its supporting bows and expansible devices to move the top to its open position over the supporting body and in its movement to lift a portion of said protecting cover to allow the forward end of the cover to move towards its open position and upon the folding of said top into its closed position, by the operation of said top operating mechanism for lowering the top, to lower the said portion of the top to form a housing for the supporting bows, expansible devices and a major portion of the top.

3. In a foldable top, a top or cover, mechanism for operating said top to raise or lower it to its open or to its closed position, supporting bows for the top and forming a part of said top operating mechanism provided with oppositely arranged segment gears on its lower ends, a supporting body on which said bows are pivotally mounted, expansible devices pivotally connected to said bows and to said top and forming part of said top operating mechanism, a motor, a motor-shaft driven by said motor, a power transmitting shaft, a gear wheel fast on said power transmitting shaft and continuously co-operating with said motor shaft, pinions fast on the opposite ends of said power transmitting shaft and continuously in engagement with said segment gears on the lower ends of said top operating mechanism and adapted in the operation of said power transmitting shaft in one direction to operate said segment gears to actuate the top operating mechanism to raise the top to its open position over the supporting body or when the power transmitting shaft is operated in an opposite direction, by reversing the motor, to operate said segment gears to actuate the top operating mechanism to lower the top to its closed position on the supporting body.

4. In a foldable top, a supporting body, relatively movable bows mounted on the supporting body, motor driven mechanism for opening and closing said bows, extensible mechanism mounted on the bows to be extended when the bows are opened and to be retracted when the bows are closed, a flexible cover carried by the bows and extensible mechanism to be collapsed on the closing of the bows and retraction of the extensible mechanism and said cover to be expanded on the separation of the bows and extension of the extensible mechanism, and a protective housing formed of stiff sections hinged together carried by the bows, said sections operating to fold into a box-like formation on the collapse of the cover to contain portions of the cover, bows and extensible mechanism.

5. In a foldable top, a supporting body, a main bow pivoted to the supporting body, a pivoted auxiliary bow mounted on the body cooperating with the main bow, motor driven mechanism for opening and closing said bows, extensible mechanism mounted on the bows to be extended when the bows are opened and to be retracted when the bows are closed, a flexible cover carried by the bows and extensible mechanism to be collapsed on the closing of the bows and the retraction of the extensible mechanism and said cover to be expanded on the separation of the bows and extension of the extensible mechanism, and a protective housing of stiff sections coextensive with the rear part of the flexible cover with one section of angular formation secured over the auxiliary bow and with the other section hinged to the forward or upper edge of the angular section, said sections operating to fold into a box-like receptacle on the collapse of the top to contain portions of the cover, bows and extensible mechanism.

6. In a foldable top, a supporting body, a main bow pivoted to the supporting body, an auxiliary bow pivoted to the main bow, motor driven mechanism for turning the main bow on its pivot to open and close the bows, a break-joint link connecting the free end of the auxiliary bow with the supporting body to limit the upward movement of the auxiliary bow, a lazy-tongs having its operating levers connected with the main and auxiliary bows so that an opening of said bows will extend the lazy-tongs and a closing of the bows will retract the lazy-tongs, arches on the forward end of the lazy-tongs, a flexible cover attached at its rear end to the supporting body and at its forward end to said arches and extending over said bows and said lazy-tongs, said cover operating to be expanded by the opening of the bows and extension of the lazy-tongs and to be collasped by the closing of the bows and retraction of the lazy-tongs, and a protective housing of stiff sections coextensive with the rear part of the flexible cover with one section of angular formation secured over the auxiliary bow and with the other section hinged to the forward or upper edge of the angular section, both of said sections having sides projecting from their outer edges, said sections operating to fold into a box-like receptacle on the collapse of the top to contain portions of the flexible cover, bows, lazy-tongs, and arches.

7. In a foldable top, a supporting body, a main bow pivoted to the supporting body, an auxiliary bow pivoted to the main bow, a break-joint link connecting the free end of the auxiliary bow with the supporting body to limit the upward movement of the auxiliary bow, a lazy-tongs having its operating levers connected with the main and auxiliary bows to be extended and contracted by the opening and closing of the bows, arches on the forward end of the lazy-tongs, a flexible cover attached at its rear end to the back of the supporting body and at its forward end attached to said arches, and motor driven mechanism for turning the main bow on its pivot to move said main bow away from the auxiliary bow held by the break-joint link, the separation of the bows operating to extend the lazy-tongs to project the flexible cover to its full open position without manual manipulation, and said motor driven mechanism also operating to turn the main bow in the opposite direction to close the bows to retract the lazy-tongs and to break the break-joint link to move the top from its full open position to its full collapsed position without manual manipulation.

In testimony whereof we affix our signatures in presence of two witnesses.

DELTON C. WATT.
FREDERICK A. GREARSON.

Witnesses:
EARLE R. DAVIS,
GELSIE MONTI.